United States Patent
Rashedi et al.

(10) Patent No.: US 12,070,744 B2
(45) Date of Patent: Aug. 27, 2024

(54) VALVE ASSEMBLIES AND RELATED SYSTEMS

(71) Applicant: ILLUMINA, INC., San Diego, CA (US)

(72) Inventors: Ahmadreza Rashedi, San Diego, CA (US); Gregory Holst, San Diego, CA (US); Rajagopal Panchapakesan, Escondido, CA (US)

(73) Assignee: ILLUMINA, INC., San Diego, CA (US)

( * ) Notice: Subject to any disclaimer, the term of this patent is extended or adjusted under 35 U.S.C. 154(b) by 193 days.

(21) Appl. No.: 17/526,943

(22) Filed: Nov. 15, 2021

(65) Prior Publication Data

US 2022/0339621 A1 Oct. 27, 2022

Related U.S. Application Data

(60) Provisional application No. 63/178,301, filed on Apr. 22, 2021.

(51) Int. Cl.
*B01L 3/00* (2006.01)
*G01N 35/10* (2006.01)

(52) U.S. Cl.
CPC .......... *B01L 3/502* (2013.01); *G01N 35/1002* (2013.01); *G01N 35/1016* (2013.01);
(Continued)

(58) Field of Classification Search
CPC ............... B01L 3/502; B01L 2200/026; B01L 2200/143; B01L 2200/16;
(Continued)

(56) References Cited

U.S. PATENT DOCUMENTS 6,266,459 B1  7/2001  Walt et al.
6,355,431 B1  3/2002  Chee et al.
(Continued)

FOREIGN PATENT DOCUMENTS

JP   2003-111481 A   4/2003
WO   WO-1991/006678 A1   5/1991
(Continued)

OTHER PUBLICATIONS

Nguyen et al. "On Algorithms for Planning S-Curve Profiles," International Journal of Advanced Robotic Systems, vol. 5, No. 1, pp. 99-106 (2008) (Year: 2008).*

(Continued)

*Primary Examiner* — Jill A Warden
*Assistant Examiner* — Michael Stanley Gzybowski
(74) *Attorney, Agent, or Firm* — MARSHALL, GERSTEIN & BORUN LLP

(57) ABSTRACT

Valve assemblies and related systems are disclosed. An apparatus includes or comprises a system including or comprising an imaging system, a flow cell interface having a corresponding flow cell receptacle, a stage assembly, and a valve assembly including or comprising a valve and a valve drive assembly. The stage assembly moves the flow cell interface relative to the imaging system and the valve drive assembly is to drive the valve using shaped input signals to reduce vibration imposed on at least one of the stage assembly or another component of the apparatus based on movement of the valve.

8 Claims, 9 Drawing Sheets

(52) U.S. Cl.
CPC ... *B01L 2200/026* (2013.01); *B01L 2200/143* (2013.01); *B01L 2200/16* (2013.01); *B01L 2300/0654* (2013.01); *B01L 2300/0663* (2013.01); *B01L 2300/0877* (2013.01); *B01L 2400/06* (2013.01)

(58) Field of Classification Search
CPC ..... B01L 2300/0654; B01L 2300/0663; B01L 2300/0877; B01L 2400/06; G01N 35/1002; G01N 35/101
See application file for complete search history.

(56) References Cited

U.S. PATENT DOCUMENTS

| | | | |
|---|---|---|---|
| 6,770,441 | B2 | 8/2004 | Dickinson et al. |
| 6,859,570 | B2 | 2/2005 | Walt et al. |
| 7,057,026 | B2 | 6/2006 | Barnes et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,405,281 | B2 | 7/2008 | Xu et al. |
| 7,622,294 | B2 | 11/2009 | Walt et al. |
| 9,976,174 | B2 | 5/2018 | Rawlings et al. |
| 10,907,178 | B2 | 2/2021 | Bernate et al. |
| 10,944,351 | B2 | 3/2021 | Kaidu et al. |
| 2005/0227252 | A1 | 10/2005 | Moon et al. |
| 2008/0108082 | A1 | 5/2008 | Rank et al. |
| 2019/0351413 | A1 | 11/2019 | Delattre et al. |
| 2020/0319220 | A1 | 10/2020 | de Ruyter et al. |

FOREIGN PATENT DOCUMENTS

| | | |
|---|---|---|
| WO | WO-2000/063437 A2 | 10/2000 |
| WO | WO-2004/024328 A1 | 3/2004 |
| WO | WO-2004/018497 A3 | 6/2004 |
| WO | WO-2005/033681 A1 | 4/2005 |
| WO | WO-2007/123744 A2 | 11/2007 |

OTHER PUBLICATIONS

Bentley, et al., Nature, "Accurate whole human genome sequencing using reversible terminator chemistry", vol. 456, Nov. 6, 2008 (Article).

* cited by examiner

VALVE ASSEMBLIES AND RELATED SYSTEMS

RELATED APPLICATION

This application claims the benefit of and priority to U.S. Provisional Patent Application No. 63/178,301, filed Apr. 22, 2021, the content of which is incorporated by reference herein in its entireties and for all purposes.

BACKGROUND

Sequencing platforms may include valves and pumps. The valves and pumps may be used to perform various fluidic operations.

SUMMARY

Shortcomings of the prior art can be overcome and advantages and benefits as described later in this disclosure can be achieved through the provision of valve assemblies and related systems. This application describes various implementations of the apparatus and methods. The apparatus and methods described, including and excluding the additional implementations enumerated below, in any combination (provided these combinations are not inconsistent), may overcome these shortcomings and achieve the advantages and benefits described herein.

In accordance with a first implementation, an apparatus includes or comprises a pair of flow cell assemblies including or comprising flow cells. The apparatus also includes or comprises a system that includes or comprises an imaging system, a flow cell interface, a stage assembly, and a pair of reagent selector valve assemblies. The flow cell interface has the corresponding flow cell receptacles that support corresponding flow cell assemblies. The stage assembly is associated with a controller that causes the stage assembly to move the flow cell assemblies relative to the imaging system. Each reagent selector valve assembly corresponds to one of the flow cell assemblies and has a reagent selector valve and a valve drive assembly. The valve drive assembly is to drive the corresponding reagent selector valve using shaped input signals to reduce vibration imposed on the stage assembly based on movement of the reagent selector valve.

In accordance with a second implementation, an apparatus includes or comprises a system having or comprising an imaging system, a flow cell interface having or comprising a corresponding flow cell receptacle, a stage assembly that moves the flow cell interface relative to the imaging system, a motor, and a drive assembly. The drive assembly is to drive the motor using shaped input signals to reduce vibration imposed on at least one of the stage assembly or another component of the apparatus based on movement of the motor.

In accordance with a third implementation, an apparatus includes or comprises an optical instrument and a fluidics system including or comprising a valve assembly including or comprising a valve and a valve drive assembly. The valve drive assembly is to drive the valve using shaped input signals to reduce vibration imposed on the optical instrument or associated with images obtained by the optical instrument based on movement of the valve.

In accordance with a fourth implementation, a method includes or comprises imaging a flow cell of a flow cell assembly carried by a flow cell interface using an imaging system of an apparatus, moving the flow cell assembly relative to the imaging system using a stage assembly based on a command from an associated controller, and driving a motor of the apparatus using shaped input signals to reduce vibration imposed on at least one of the stage assembly or another component of the apparatus based on movement of the motor.

In accordance with a fifth implementation, an apparatus includes or comprises a system comprises or including an imaging system, a flow cell interface, a stage assembly, a pair of reagent selector valve assemblies, and a motor. The flow cell interface has a pair of flow cell receptacles and the stage assembly is associated with a controller that causes the stage assembly to move the flow cell interface relative to the imaging system. The pair or reagent selector valve assemblies each corresponding to one of the flow cell receptacles and having or comprising a reagent selector valve. The system drives the motor to reduce vibration imposed on the stage assembly based on movement of the reagent selector valves.

In accordance with a sixth implementation, a method includes or comprises imaging a flow cell of a flow cell assembly carried by a flow cell interface using an imaging system of an apparatus; moving the flow cell assembly relative to the imaging system using a stage assembly based on a command from an associated controller; driving a valve of the apparatus to flow reagent to a second flow cell; and reducing vibration imposed on at least one of the stage assembly or another component of the apparatus.

In accordance with a seventh implementation, an apparatus includes or comprises a system including or comprising an imaging system, a flow cell interface having or comprising a corresponding flow cell receptacle, a stage assembly, and a valve assembly including or comprising a valve and a valve drive assembly. The stage assembly moves the flow cell interface relative to the imaging system and the valve drive assembly is to drive the valve using shaped input signals to reduce vibration imposed on at least one of the stage assembly or another component of the apparatus based on the movement of the valve.

In accordance with a eighth implementation, an apparatus includes or comprises a system including or comprising an imaging system, a flow cell interface having or comprising a corresponding flow cell receptacle, a stage assembly, and a valve assembly including or comprising a valve and a valve drive assembly. The stage assembly moves the flow cell interface relative to the imaging system and the valve drive assembly is to drive the valve using shaped input signals to reduce vibration imposed on at least one of the stage assembly or the imaging system based on the movement of the valve.

In accordance with a ninth implementation, a method includes or comprises: imaging a flow cell of a flow cell assembly carried by a flow cell interface using an imaging system of an apparatus; moving the flow cell assembly relative to the imaging system using a stage assembly based on a command from an associated controller; and driving a valve of the apparatus using shaped input signals to reduce vibration imposed on at least one of the stage assembly or another component of the apparatus based on movement of the valve.

In further accordance with the foregoing first, second, third, fourth, fifth, sixth, seventh, eighth, and/or ninth implementations, an apparatus and/or method may further include or comprise any one or more of the following:

In accordance with an implementation, the controller associated with the stage assembly does not receive positional information from the valve drive assembly.

In accordance with another implementation, feed-forward control is not provided between the valve drive assembly and the controller associated with the stage assembly.

In accordance with another implementation, the valve drive assembly does not receive positional information from the controller associated with the stage assembly.

In accordance with another implementation, feedback control is not provided between the controller associated with the stage assembly and the valve drive assembly.

In accordance with another implementation, the shaped input signals comprise a convolved dual triangular profile.

In accordance with another implementation, the shaped input signals comprise a convolved profile.

In accordance with another implementation, the shaped input signals comprise at least two levels of acceleration.

In accordance with another implementation, the shaped input signals comprise at least two levels of deceleration.

In accordance with another implementation, the shaped input signals comprise a first shaped input signal and a second shaped input signal that are separated by time to allow the second shaped input signal to substantially cancel the first shaped input signal.

In accordance with another implementation, the shaped input signals comprise an S-curve profile.

In accordance with another implementation, the stage assembly is spaced from the reagent selector valve assemblies.

In accordance with another implementation, the reagent selector valve assemblies are carried by the flow cell interface and the stage assembly moves the flow cell interface in at least one of an x-direction or a y-direction relative to the imaging system.

In accordance with another implementation, the stage assembly includes or comprises a rotary stage.

In accordance with another implementation, the apparatus includes or comprises a plurality of reagent reservoirs and the system further includes or comprises a reagent reservoir receptacle that receives the reagent reservoir, the reagent selector valves are to be fluidically coupled to the reagent reservoirs and to selectively flow reagent from a corresponding reagent reservoir to the corresponding flow cells.

In accordance with another implementation, the valve drive assembly includes or comprises a motor.

In accordance with another implementation, the valve drive assembly includes or comprises a valve drive controller.

In accordance with another implementation, the valve drive assembly includes or comprises an encoder.

In accordance with another implementation, each of the reagent selector valves includes or comprises a rotor and a stator.

In accordance with another implementation, the stator has or comprises a common fluidic line and a plurality of reagent fluidic lines. The common fluidic line is couplable to the corresponding flow cell and the rotor interfaces with the stator to fluidically couple the common fluidic line and one or more of the reagent fluidic lines.

In accordance with another implementation, the rotor includes or comprises a groove to fluidically couple the common fluidic line and the one or more of the reagent fluidic lines.

In accordance with another implementation, the motor includes or comprises a rotary motor.

In accordance with another implementation, the motor includes or comprises a linear motor.

In accordance with another implementation, the apparatus includes or comprises a valve assembly including or comprising a valve, the motor, and the drive assembly.

In accordance with another implementation, the imaging system includes or comprises a scanning electron microscope.

In accordance with another implementation, the imaging system includes or comprises a transmission electron microscope.

In accordance with another implementation, the imaging system includes or comprises an imaging flow cytometer.

In accordance with another implementation, the imaging system is associated with high-resolution optical microscopy.

In accordance with another implementation, the high-resolution optical microscope is associated with confocal microscopy.

In accordance with another implementation, the high-resolution optical microscope is associated with epifluorescence microscopy.

In accordance with another implementation, the high-resolution optical microscope is associated with two photon microscopy.

In accordance with another implementation, the high-resolution optical microscope is associated with differential interference contrast microscopy.

In accordance with another implementation, the other component of the apparatus includes or comprises the imaging system.

In accordance with another implementation, the optical instrument includes or comprises an imaging system.

In accordance with another implementation, the optical instrument includes or comprises a telescope.

In accordance with another implementation, the optical instrument includes or comprises a microscope.

In accordance with another implementation, the apparatus includes or comprises a flow cell assembly including or comprising a flow cell; a flow cell interface having or comprising a corresponding flow cell receptacle that supports the flow cell assembly; and a stage assembly associated with a controller that causes the stage assembly to move the flow cell assembly relative to the optical instrument. The valve drive assembly is to drive the valve using shaped input signals to reduce vibration imposed on the stage assembly based on the movement of the valve to reduce vibrations associated with images obtained by the optical instrument.

In accordance with another implementation, the optical instrument includes or comprises a scanning electron microscope.

In accordance with another implementation, the optical instrument includes or comprises a transmission electron microscope.

In accordance with another implementation, the optical instrument includes or comprises an imaging flow cytometer.

In accordance with another implementation, the optical instrument is associated with high-resolution optical microscopy.

In accordance with another implementation, the optical instrument is associated with confocal microscopy.

In accordance with another implementation, the optical instrument is associated with epifluorescence microscopy.

In accordance with another implementation, the optical instrument is associated with two photon microscopy.

In accordance with another implementation, the optical instrument is associated with differential interference contrast microscopy.

In accordance with another implementation, driving the motor includes or comprises driving a rotary motor.

In accordance with another implementation, driving the motor includes or comprises driving a linear motor.

In accordance with another implementation, the method further includes or comprises a second flow cell of a second flow cell assembly carried by the flow cell interface. Driving the motor including or comprising flowing reagent to the second flow cell.

In accordance with another implementation, driving the motor occurs at the same time as the imaging of the flow cell.

In accordance with another implementation, driving the motor occurs before the imaging of the flow cell.

In accordance with another implementation, driving the motor using the shaped input signals reduces a ring down phase or settling time of the vibration of the stage assembly.

In accordance with another implementation, the method further includes or comprises imaging the second flow cell.

In accordance with another implementation, the method further includes or comprises driving a second motor of the apparatus using shaped input signals to reduce vibration imposed on at least one of the stage assembly or another component of the apparatus based on movement of the second motor.

In accordance with another implementation, driving the second motor occurs at the same time as the imaging of the second flow cell.

In accordance with another implementation, driving the second motor occurs before the imaging of the second flow cell.

In accordance with another implementation, driving the valve of the apparatus using shaped input signals includes or comprises driving the valve using a valve drive assembly.

In accordance with another implementation, the controller associated with the stage assembly does not receive positional information from the valve drive assembly.

In accordance with another implementation, feed-forward control is not provided between the valve drive assembly and the controller associated with the stage assembly.

In accordance with another implementation, the valve drive assembly does not receive positional information from the controller associated with the stage assembly.

In accordance with another implementation, feedback control is not provided between the controller associated with the stage assembly and the valve drive assembly.

In accordance with another implementation, the shaped input signals include or comprise a convolved dual triangular profile.

In accordance with another implementation, the shaped input signals include or comprise a convolved profile.

In accordance with another implementation, the shaped input signals include or comprise at least two levels of acceleration.

In accordance with another implementation, the shaped input signals include or comprise at least two levels of deceleration.

In accordance with another implementation, the shaped input signals include or comprise a first shaped input signal and a second shaped input signal that are separated by time to allow the second shaped input signal to substantially cancel the first shaped input signal.

In accordance with another implementation, the shaped input signals include or comprise an S-curve profile.

In accordance with another implementation, moving the flow cell assembly relative to the imaging system using the stage assembly includes or comprises moving the flow cell assembly relative to the imaging system using the stage assembly in at least one of an x-direction or a y-direction.

In accordance with another implementation, the apparatus includes or comprises an actuator including or comprising the motor.

In accordance with another implementation, the reagent selector valve assemblies are carried by the flow cell interface and the stage assembly moves the flow cell interface in at least one of an x-direction or a y-direction relative to the imaging system.

In accordance with another implementation, reducing vibration imposed on at least one of the stage assembly or another component of the apparatus includes or comprises driving a motor to reduce the vibration imposed on at least one of the stage assembly or another component of the apparatus.

In accordance with another implementation, reducing vibration imposed on at least one of the stage assembly or another component of the apparatus includes or comprises driving the valve using shaped input signals to reduce vibration imposed on at least one of the stage assembly or another component of the apparatus.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Although the following text discloses a detailed description of implementations of methods, apparatuses, and/or articles of manufacture, the legal scope of the property right is defined by the words of the claims set forth at the end of this patent. Accordingly, the following detailed description contains examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

This disclosure is directed toward valves and valve drive assemblies used with a fluidic instrument (a sequencing system), where the valve drive assemblies drive the valves using shaped input signals. Actuating the valves using shaped input signals reduces a ring down phase or settling time of vibrations imparted on components of the fluidic instrument such as, for example, a stage assembly, a flow cell, imaging system, etc., thereby allowing an imaging system to obtain high quality images without having to wait additional time for the vibrations to be reduced.

Figure 1:
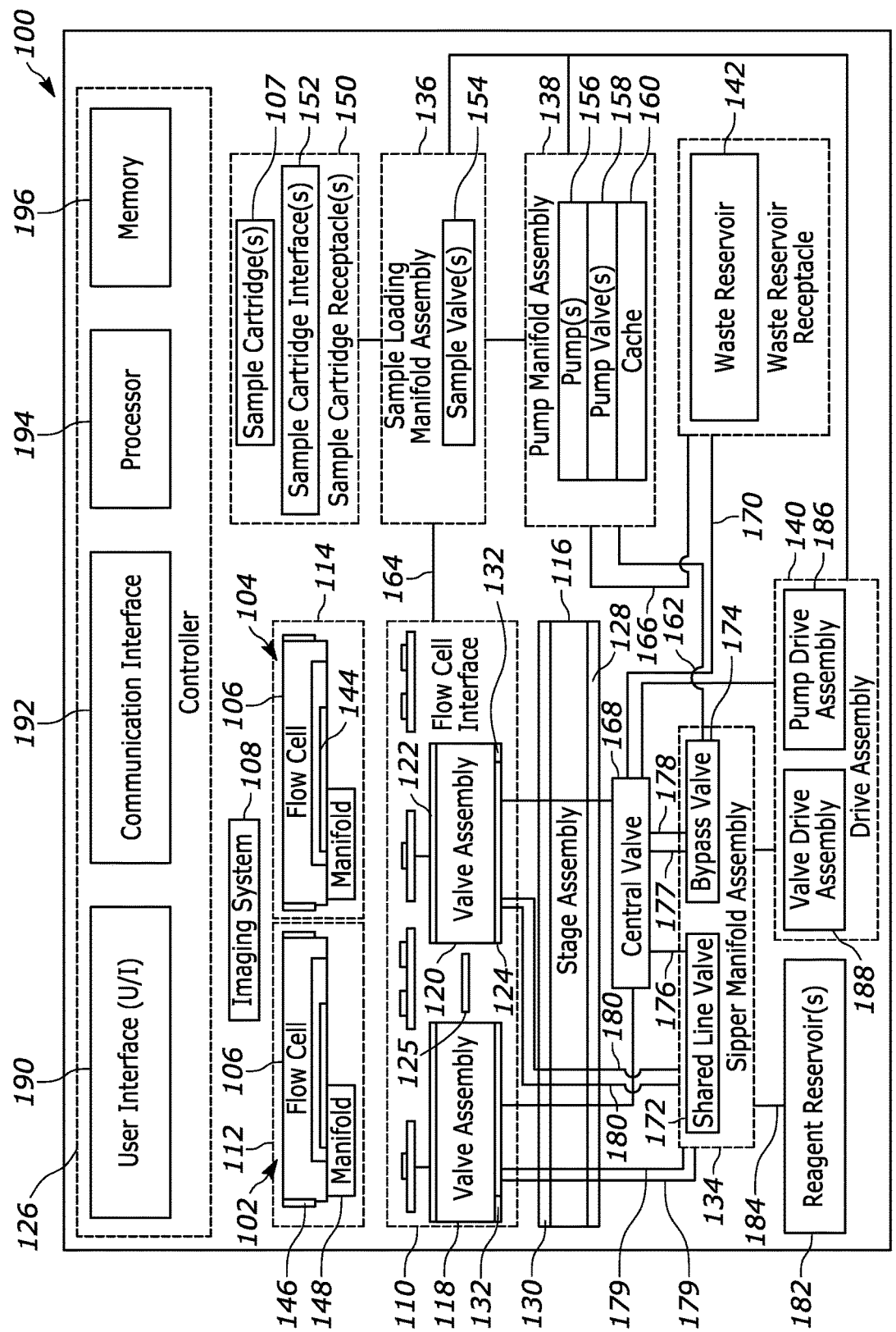
FIG. 1 illustrates a schematic diagram of an implementation of a system in accordance with the teachings of this disclosure.

FIG. 1 illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). The system 100 is adapted to receive a pair of flow cell assemblies 102, 104 in the implementation shown including corresponding flow cells 106 and a sample cartridge 107 and includes, in part, an imaging system 108 and a flow cell interface 110 having flow cell receptacles 112, 114 that support the corresponding flow cell assemblies 102, 104. The flow cell interface 110 may be associated with and/or referred to as a flow cell deck structure and includes a pair of flow cell chucks 115. The system 100 also includes a stage assembly 116, a pair of valve assemblies 118, 120 that each include a valve 122 and a valve drive assembly 124, and a controller 126. The valve assemblies 118, 120 may be reagent selector valve assemblies and may be referred to as mini-valve assemblies. FIG. 1 shows the stage assembly 116 that receives two flow cell assemblies 102, 104 however, in other implementations, the stage assembly 116 receives at least two substrates selected from a group comprising flow cells and microarrays.

The valves 122 may be reagent selector valves. The valves 122 may be linear valves or different types rotary valves, etc., however. A motor 125 may also be included. The motor 125 may be a rotary motor, a linear motor and/or part of an actuator, a vibrator, etc.

The controller 126 is electrically and/or communicatively coupled to the imaging system 108, the valve assemblies 118, 120, the stage assembly 116, the valve drive assembly 124, and the motor 125 and is adapted to cause the imaging system 108, valve assemblies 118, 120, the stage assembly 116, the valve drive assembly 124, and the motor 125 to perform various functions as disclosed herein.

The valve assemblies 118, 120 are carried by the flow cell interface 110 in this implementation and are positioned immediately adjacent to the corresponding flow cell assembly 102, 103. The proximity between the valve assemblies 118, 120 and the corresponding flow cell assemblies 102, 103 allows for reagent consumption reduction, dead volume reduction within, for example, fluidic lines, carry over reduction, switching times reduction, and/or time-to-time results.

The stage assembly 116 includes an x-drivetrain 128 that moves the flow cell interface 110 in the x-direction relative to the imaging system 108 and a y-drivetrain 130 that moves the flow cell interface 110 in the y-direction relative to the imaging system 108. The stage assembly 116 may alternatively be a rotary stage assembly. The x-drive train 128 and/or the y-drivetrain 130 may be implemented as a direct drive linear motor.

The controller 126 associated with the stage assembly 116 causes the stage assembly 116 to move the flow cell assemblies 102, 104 relative to the imaging system 108 in operation and the valve drive assembly 124 drives the corresponding valve 122 using shaped input signals to reduce vibration imposed on the stage assembly 116 based on the movement of the valve 122. The system 100 may additionally or alternatively drive the motor 125 to reduce and/or substantially cancel vibration imposed on the stage assembly 116 based on the movement of the valves 122. Shaped input signals may or may not be used to drive the valves 122 in such implementations. The vibration of the stage assembly 116 and/or portions of the stage assembly 116 may be caused by an off-balance eccentric mass of a motor or other drivetrain components such as a cam in a harmonic drive gearbox associated with the valve 122 and/or the valve drive assembly 124. The valve drive assembly 124 may be a rotary system having rotational forces that are transformed into linear forces within the system 100 that become sinusoidal forces. Control signals to the valve drive assembly 124 may be input shaped versions of a triangle profile or s-curve profile (non-sinusoidal) to address the forces that contribute to the stage vibration that are sinusoidal.

The controller 126 associated with the stage assembly 116 in some implementations does not receive positional information from the valve drive assembly 124 and/or the valve drive assembly 124 does not receive positional information from the controller 126 associated with stage assembly 116. Feedback control and/or feed forward control may not be provided between the valve drive assembly 124 and the controller 126 and/or between the controller 126 and the valve drive assembly 124. Feedback control and/or feed forward control may, however, be provided between the valve drive assembly 124 and the controller 126 and/or between the controller 126 and the valve drive assembly 124. Tuning issues, variability, etc. may be addressed in such implementations.

The shaped input signals include a convolved dual triangular profile, an S-curve profile, a convolved profile, at least two levels of acceleration, and/or at least two levels of deceleration, in some implementations. The movement profile of the valves 122 may include a slower acceleration and a faster acceleration, a semi-constant velocity (e.g., these profiles may be separated in time by a few milliseconds), and a slower deceleration and a faster deceleration, for example. Any type of movement profile, however, may be used to reduce vibration and/or frequencies within subsystems of the system 100 such as the stage assembly 116 that are remote to or otherwise spaced from the valve assembly 118 being actuated. The shaped input signals may be associated with a Zero Vibration (ZV) input shaper, a Zero Vibration and Derivative (ZVD, ZVDD, ZVDDD) input shaper, an Extra Insensitive (EI) input shaper, a Multi-hump EI input shaper, a Negative input shaper, etc., for example. These input shapers and other movement profiles used in accordance with the teachings of this disclosure can be used to reduce overall vibration of the system 100 and may also in certain embodiments increase speed, robustness to variation, real-time calculation methods, and/or may be combined with feedback controllers, etc.

The imaging system 108 may obtain image data associated with one of the flow cell assemblies 102, 104 and the valve 120 associated with the other one of the flow cell assemblies 102, 104 can be actuated without substantially imparting vibration into the system 100 using the disclosed implementations. The disclosed implementations as such can obtain higher quality image data using a dual flow cell system, where one of the flow cells 106 is imaged while reagents are flowed into and/or chemical reactions occur in the other of the flow cells 106. The system 100 allows for higher throughput by using input shaping commands to control the valve assemblies 118, 120 by reducing vibrations within the system 100 that may otherwise adversely affect the quality of images obtained of one of the flow cells 106 while also not delaying fluidic operations performed on another one of the flow cells 106.

Each of the valve assemblies 118, 120 has a memory 132 in the implementation shown storing instructions, such as commands associated with the shaped input signals that cause the corresponding valve drive assemblies 124 to actuate the valves 122 in a manner that reduces vibration in other components of the system 100 such as, for example, the stage assembly 116. While the above-example mentions the stage assembly 116 experiencing reduced vibration when the valve 122 is controlled using a shaped input signal, other or additional components of the system 100 may experience reduced vibration as well.

Referring still to the system 100 of FIG. 1, the system 100 also includes a sipper manifold assembly 134, a sample loading manifold assembly 136, a pump manifold assembly 138, a drive assembly 140, and a waste reservoir 142 in the implementation shown. The controller 126 is electrically and/or communicatively coupled to the sipper manifold assembly 134, the sample manifold assembly 136, the pump manifold assembly 138, and the drive assembly 140 and is adapted to cause the sipper manifold assembly 134, the sample manifold assembly 136, the pump manifold assembly 138, and the drive assembly 140 to perform various functions as disclosed herein.

Referring to the flow cells 106, each of the flow cells 106 includes a plurality of channels 144, each having a first channel opening positioned at a first end of the flow cell 106 and a second channel opening positioned at a second end of the flow cell 106. Depending on the direction of flow through the channels 144, either of the channel openings may act as an inlet or an outlet. While the flow cells 106 are shown including two channels 144 in FIG. 1, any number of channels 144 may be included (e.g., 1, 2, 6, 8).

Each of the flow cell assemblies 102, 104 also includes a flow cell frame 146 and a flow cell manifold 148 coupled to the first end of the corresponding flow cell 106. As used herein, a "flow cell" (also referred to as a flowcell) can include a device having a lid extending over a reaction structure to form a flow channel therebetween that is in communication with a plurality of reaction sites of the reaction structure. Some flow cells may also include a detection device that detects designated reactions that occur at or proximate to the reaction sites. As shown, the flow cell 106, the flow cell manifold 148, and/or any associated gaskets used to establish a fluidic connection between the flow cell 106 and the system 100 are coupled or otherwise carried by the flow cell frame 146. While the flow cell frame 146 is shown included with the flow cell assemblies 102, 104 of FIG. 1, the flow cell frame 146 may be omitted. The flow cell 106 and the associated flow cell manifold 148 and/or gaskets as such may be used with the system 100 without the flow cell frame 146.

Components of the system 100 that are shown once and being coupled to both of the flow cells 106 can be duplicated in some implementations such that each flow cell 106 has its own corresponding components. Each flow cell 106 may be associated with a separate sample cartridge 107, sample loading manifold assembly 136, pump manifold assembly 138, etc., for example. The system 100 may include a single flow cell 106 and corresponding components in other implementations.

Referring now to the sample cartridge 107, the sample loading manifold assembly 136, and the pump manifold assembly 138, the system 100 includes a sample cartridge receptacle 150 that receives the sample cartridge 107 that carries one or more samples of interest (e.g., an analyte), in the implementation shown. The system 100 also includes a sample cartridge interface 152 that establishes a fluidic connection with the sample cartridge 107.

The sample loading manifold assembly 136 includes one or more sample valves 154 and the pump manifold assembly 138 includes one or more pumps 156, one or more pump valves 158, and a cache 160. One or more of the valves 154, 158 may be implemented by a rotary valve, a pinch valve, a flat valve, a solenoid valve, a check valve, a piezo valve, a two-way valve, a three-way valve, an electrically-actuated valve, an pneumatically-actuated valve, and combinations thereof. Different types of fluid control devices may be used, however. One or more of the pumps 156 may be implemented by a syringe pump, a peristaltic pump, and/or a diaphragm pump. Other types of fluid transfer devices may be used, however. The cache 160 may be a serpentine cache and may temporarily store one or more reaction components during, for example, bypass manipulations of the system 100 of FIG. 1. While the cache 160 is shown being included in the pump manifold assembly 138, in another implementation, the cache 160 may be located in a different location. The cache 160 may be included in the sipper manifold assembly 134 or in another manifold downstream of a bypass fluidic line 162, for example.

The sample loading manifold assembly 136 and the pump manifold assembly 138 flow one or more samples of interest from the sample cartridge 107 through a fluidic line 164 toward the flow cell assembly 102, 104. The sample loading manifold assembly 136 can individually load/address each channel 144 of the flow cell 106 with a sample of interest. The process of loading the channels 144 of the flow cell 106 with a sample of interest may occur automatically using the system 100 of FIG. 1.

As shown in the system 100 of FIG. 1, the sample cartridge 107 and the sample loading manifold assembly 136 are positioned downstream of the flow cell assemblies 102, 104. The sample loading manifold assembly 136 may thus load a sample of interest into the flow cell 106 from the rear of the flow cell 106. Loading a sample of interest from the rear of the flow cell 106 may be referred to as "back loading." Back loading the sample of interest into the flow cell 106 may reduce contamination. The sample loading manifold assembly 136 is coupled between the flow cell assemblies 102, 104 and the pump manifold assembly 138 in the implementation shown.

To draw a sample of interest from the sample cartridge 107 and toward the pump manifold assembly 138, the sample valves 154, the pump valves 158, and/or the pumps 156 may be selectively actuated to urge the sample of interest toward the pump manifold assembly 138. The sample cartridge 107 may include a plurality of sample reservoirs that are selectively fluidically accessible via the corresponding sample valve 154. Each sample reservoir can thus be selectively isolated from other sample reservoirs using the corresponding sample valves 154.

To individually flow the sample of interest toward a corresponding channel of one of the flow cells 106 and away from the pump manifold assembly 138, the sample valves 154, the pump valves 158, and/or the pumps 156 can be selectively actuated to urge the sample of interest toward the flow cell assembly 102 and into the respective channels 144 of the corresponding flow cell 106. Each channel 144 of the flow cell 106 receives the sample of interest in some implementations. One or more of the channels 144 of the flow cell(s) 106 selectively receives the sample of interest and others of the channels 144 of the flow cell(s) 106 do not receive the sample of interest in other implementations. The channels 144 of the flow cell(s) 107 that may not receive the sample of interest may receive a wash buffer instead, for example.

The drive assembly 140 interfaces with the sipper manifold assembly 134 and the pump manifold assembly 138 to flow one or more reagents that interact with the sample within the corresponding flow cell 106. A reversible terminator is attached to the reagent in an implementation to allow a single nucleotide to be incorporated onto a growing DNA strand. One or more of the nucleotides has a unique fluorescent label that emits a color when excited in some such implementations. The color (or absence thereof) is used to detect the corresponding nucleotide. The imaging system 108 excites one or more of the identifiable labels (e.g., a fluorescent label) in the implementation shown and thereafter obtains image data for the identifiable labels. The labels may be excited by incident light and/or a laser and the image data may include one or more colors emitted by the respective labels in response to the excitation. The image data (e.g., detection data) may be analyzed by the system 100. The imaging system 108 may be a fluorescence spectrophotometer including an objective lens and/or a solid-state imaging device. The solid-state imaging device may include a charge coupled device (CCD) and/or a complementary metal oxide semiconductor (CMOS). Other types of imaging systems and/or optical instruments may be used, however. The imaging system 108 may be or be associated with a scanning electron microscope, a transmission electron microscope, an imaging flow cytometer, high-resolution optical microscopy, confocal microscopy, epifluorescence microscopy, two photon microscopy, differential interference contrast microscopy, etc., for example.

After the image data is obtained, the drive assembly 140 interfaces with the sipper manifold assembly 134 and the pump manifold assembly 138 to flow another reaction component (e.g., a reagent) through the flow cell 106 that is thereafter received by the waste reservoir 142 via a primary waste fluidic line 166 and/or otherwise exhausted by the system 100. Some reaction components perform a flushing operation that chemically cleaves the fluorescent label and the reversible terminator from the sstDNA. The sstDNA is then ready for another cycle.

The primary waste fluidic line 166 is coupled between the pump manifold assembly 138 and the waste reservoir 142. The pumps 156 and/or the pump valves 158 of the pump manifold assembly 138 selectively flow the reaction components from the flow cell assembly 102, 104, through the fluidic line 164 and the sample loading manifold assembly 136 to the primary waste fluidic line 166, in some implementations.

The flow cell assembly 102, 104 is coupled to a central valve 168 via the flow cell interface 110. An auxiliary waste fluidic line 170 is coupled to the central valve 168 and to the waste reservoir 142. The auxiliary waste fluidic line 170 receives excess fluid of a sample of interest from the flow cell assembly 102, 104, via the central valve 168, and flows the excess fluid of the sample of interest to the waste reservoir 142, in some implementations, when back loading the sample of interest into the flow cell 106 as described herein. That is, the sample of interest may be loaded from the rear of the flow cell 106 and any excess fluid for the sample of interest may exit from the front of the flow cell 106. Different samples can be separately loaded to corresponding channels 144 of the corresponding flow cell 106 by back loading samples of interest into the flow cell 106 and the single flow cell manifold 148 can couple the front of the flow cell 106 to the central valve 168 to direct excess fluid of each sample of interest to the auxiliary waste fluidic line 170. The flow cell manifold 148 can be used to deliver common reagents from the front of the flow cell 106 (e.g., upstream) for each channel 144 of the flow cell 106 that exit from the rear of the flow cell 106 (e.g., downstream) once the samples of interest are loaded into the flow cell 106. Put another way, the sample of interest and the reagents may flow in opposite directions through the channels 144 of the flow cell 106.

Referring to the sipper manifold assembly 134, the sipper manifold assembly 134 includes a shared line valve 172 and a bypass valve 174 in the implementation shown. The shared line valve 172 may be referred to as a reagent selector valve. The valves 122 of the valve assemblies 118, 120, the central valve 168, and/or the valves 172, 174 of the sipper manifold assembly 134 may be selectively actuated to control the flow of fluid through fluidic lines 176, 177, 178, 179, 180. One or more of the valves 122, 158, 168, 172, 174 may be implemented by a rotary valve, a pinch valve, a flat valve, a solenoid valve, a check valve, a piezo valve, etc. Other fluid control devices may prove suitable.

The sipper manifold assembly 134 may be coupled to a corresponding number of reagents reservoirs 182 via reagent sippers 184. The reagent reservoirs 182 may contain fluid (e.g., reagent and/or another reaction component). The sipper manifold assembly 134 includes a plurality of ports in some implementations. Each port of the sipper manifold assembly 134 may receive one of the reagent sippers 184. The reagent sippers 184 may be referred to as fluidic lines.

The shared line valve 172 of the sipper manifold assembly 134 is coupled to the central valve 168 via the shared reagent fluidic line 176. Different reagents may flow through the shared reagent fluidic line 176 at different times. The pump manifold assembly 138 may draw wash buffer through the shared reagent fluidic line 176, the central valve 168, and the corresponding flow cell assembly 102, 104 when performing a flushing operation before changing between one reagent and another. The shared reagent fluidic line 176 may thus be involved in the flushing operation. While one shared reagent fluidic line 176 is shown, any number of shared fluidic lines may be included in the system 100.

The bypass valve 174 of the sipper manifold assembly 134 is coupled to the central valve 168 via the reagent fluidic lines 177, 178. The central valve 168 may have one or more ports that correspond to the reagent fluidic lines 177, 178.

The dedicated fluidic lines 179, 180 are coupled between the sipper manifold assembly 134 and the valve assemblies 118, 120. Each of the dedicated reagent fluidic lines 179, 180 may be associated with a single reagent. The fluids that may flow through the dedicated reagent fluidic lines 179, 180 may be used during sequencing operations and may include a cleave reagent, an incorporation reagent, a scan reagent, a cleave wash, and/or a wash buffer. The dedicated reagent fluidic lines 179 180 themselves may not be flushed when performing a flushing operation before changing between one reagent and another because only a single reagent may flow through each of the dedicated reagent fluidic lines 179, 180. The approach of including dedicated reagent fluidic lines 179, 180 may be helpful when the system 100 uses reagents that may have adverse reactions with other reagents. Reducing a number of fluidic lines or length of the fluidic lines that are flushed when changing between different reagents moreover reduces reagent consumption and flush volume and may decrease cycle times of the system 100. While four dedicated reagent fluidic lines 179, 180 are shown, any number of dedicated fluidic lines may be included in the system 100.

The bypass valve 174 is also coupled to the cache 160 of the pump manifold assembly 138 via the bypass fluidic line 162. One or more reagent priming operations, hydration operations, mixing operations, and/or transfer operations may be performed using the bypass fluidic line 162. The priming operations, the hydration operations, the mixing operations, and/or the transfer operations may be performed independent of the flow cell assembly 102, 104. The operations using the bypass fluidic line 162 may thus occur during, for example, incubation of one or more samples of interest within the flow cell assembly 102, 104. That is, the shared line valve 172 can be utilized independently of the bypass valve 174 such that the bypass valve 174 can utilize the bypass fluidic line 162 and/or the cache 160 to perform one or more operations while the shared line valve 172 and/or the central valve 168 simultaneously, substantially simultaneously, or offset synchronously perform other operations. The system 100 can thus perform multiple operations at once, thereby reducing run time.

Referring now to the drive assembly 140, the drive assembly 140 includes a pump drive assembly 186 and a valve drive assembly 188 in the implementation shown. The pump drive assembly 186 may be adapted to interface with the one or more pumps 156 to pump fluid through the flow cell 106 and/or to load one or more samples of interest into the flow cell 106. The valve drive assembly 188 may be adapted to interface with one or more of the valves 154, 158, 168, 172, 174 to control the position of the corresponding valves 154, 158, 168, 172, 174.

Referring to the controller 126, in the implementation shown, the controller 126 includes a user interface 190, a communication interface 192, one or more processors 194, and a memory 196 storing instructions executable by the one or more processors 194 to perform various functions including the disclosed implementations. The user interface 190, the communication interface 133, and the memory 196 are electrically and/or communicatively coupled to the one or more processors 194.

The user interface 190 is adapted to receive input from a user and to provide information to the user associated with the operation of the system 100 and/or an analysis taking place in an implementation. The user interface 190 may include a touch screen, a display, a key board, a speaker(s), a mouse, a track ball, and/or a voice recognition system. The touch screen and/or the display may display a graphical user interface (GUI).

The communication interface 192 is adapted to enable communication between the system 100 and a remote system(s) (e.g., computers) via a network(s) in an implementation. The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 194 and/or the system 100 may include one or more of a processor-based system(s) or a microprocessor-based system(s). The one or more processors 194 and/or the system 100 in some implementations includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 196 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 2:
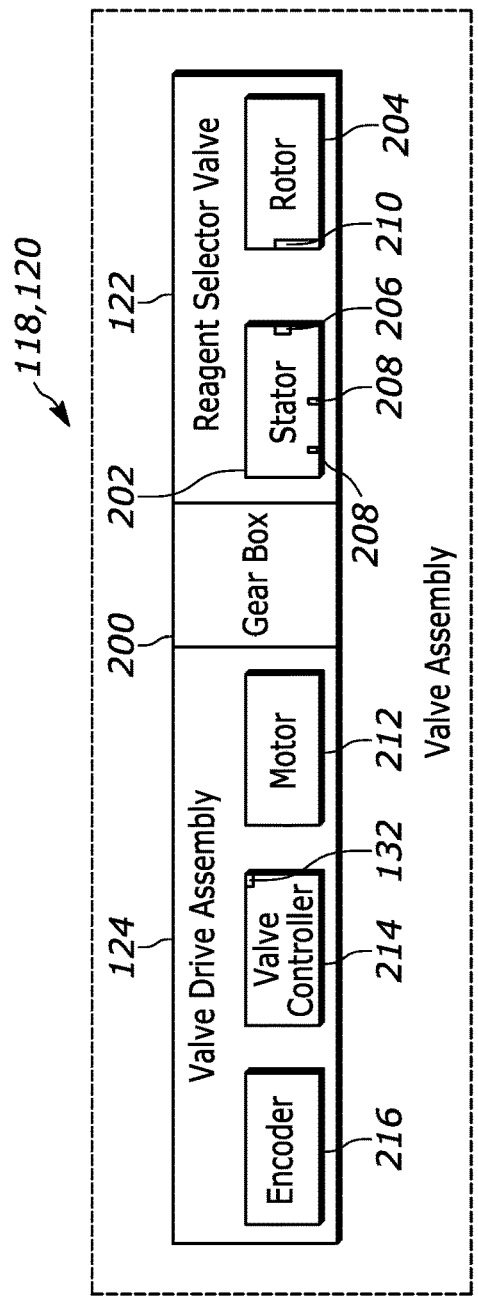
FIG. 2 is a schematic illustration of an example implementation of the reagent selector valve that can be used with the system of FIG. 1.

FIG. 2 is schematic illustration of an example implementation of the valve assembly 118, 120 that can be used with the system 100 of FIG. 1. The valve assembly 118, 120 includes the valve 122, a gear box 200, and the valve drive assembly 124 in the implementation shown. The valve 122 includes a stator 202 and a rotor 204. The stator 202 has a common fluidic line 206 and a plurality of reagent fluidic lines 208 and the rotor 204 has a fluidic channel 210. The common fluidic line 206 may be couplable to the flow cell 106. The rotor 204 interfaces with the stator 202 in operation to fluidically couple the common fluidic line 206 and one or more of the reagent fluidic lines 208 using the fluidic channel 210 of the rotor 204.

Referring to the gear box 200, the gear box 200 and/or the valve drive assembly 124 may be adapted to apply a relatively high torque value to the valve 122 in the implementation shown. The relative high torque value may be approximately 140 ounces per inch. Other torque values may be achieved using the gear box 200 and/or the valve drive assembly 124. The gear box 200 may guide rotation of the rotor 204. The gear box 200 may be a multi-stage planetary gear box or a spur gear box. Other types of gear boxes may prove suitable.

The gear box 200 is coupled between the valve drive assembly 124 and the valve 122. The gear box 200 may be adapted to reduce a likelihood that vibrations generated by the valve drive assembly 124 affect the flow cell assembly 102, 104. The gear box 200 may include a strain wave gear drive. The gear box 200 may include a harmonic gear. Other types of gears may prove suitable. The gear box 200 may be adapted to provide a gear reduction and a large torque.

The valve drive assembly 124 includes a motor 212, a valve controller 214, and an encoder 216 in the implementation shown. The motor 212 may include a brushless motor and/or a stepper motor and have a rotor that is precision balanced to reduce vibrations imposed on the stage assembly 116 and/or other components of the system 100. Any type of motor may be used, however. The valve controller 214 may include or have access to the memory 132 that stores instructions, such as commands associated with the shaped input signals. The encoder 216 may obtain feedback to control the motion profiles, actuation speeds, and/or the position the valve 122.

Figure 3:
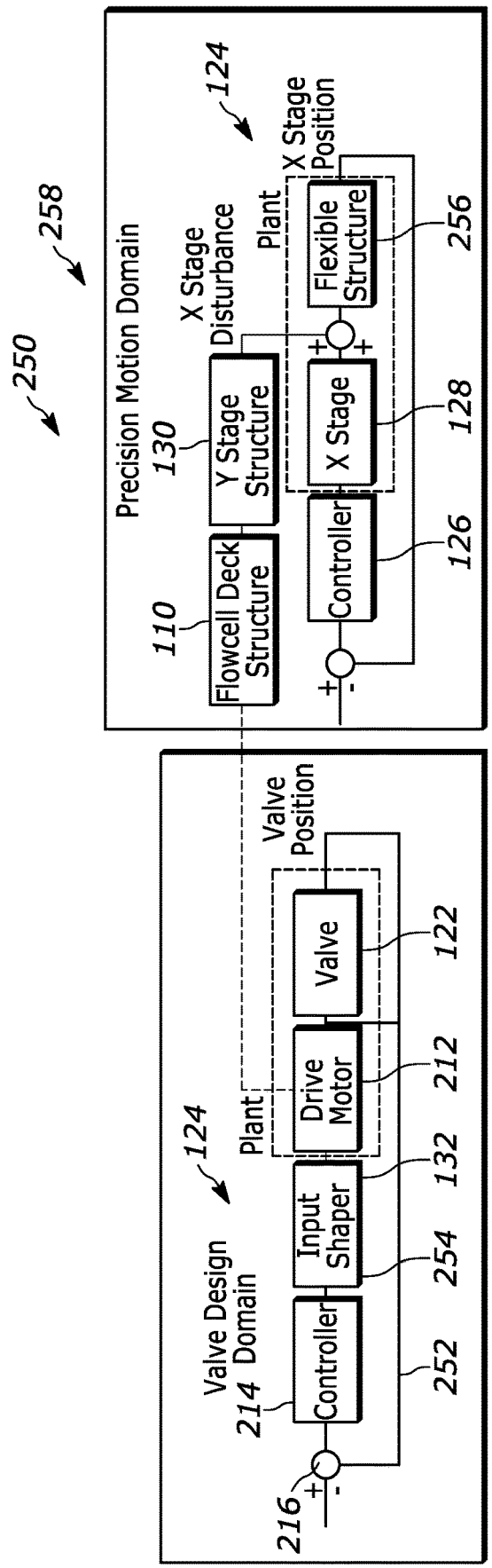
FIG. 3 is a schematic illustration of a portion of the system of FIG. 1 including the valve drive assembly of FIG. 2.

FIG. 3 is a schematic illustration of a portion 250 of the system 100 of FIG. 1 including the valve drive assembly 124 of FIG. 2. A feedback loop 252 is shown in the implementation shown between the valve 122 and the encoder 216 and an input shaper 254 is included that includes the memory 132. The input shaper 254 may be associated with firmware of the valve assembly 118, 120. The input shaper 254 may be associated with a controller, firmware, and/or memory this is physically separate from the valve 122 but electrically connected to the drive motor 212.

The x-drivetrain 128 of the stage assembly 116 is coupled to a flexible structure 256 and the flexible structure 256 and the x-drivetrain 128 are remote to the valve drive assembly 124 in the implementation shown. Using shaped input control thus affects the movement of the motor 212 and the valve 122 which in turn reduces vibration in a remote subsystem 258 of the system 100 including, for example, the x-drivetrain 128. Input shaping here is different than feed-forward control because the valve 122 is not sending a measured parameter into the X stage controller 126 that the X-stage controller 126 could respond to. As such, vibration reduction using the teachings of this disclosure is performed based on the physical interaction between the components of the system 100 including, for example, the valve assemblies 118, 120 and the x-drivetrain 128 and do not link the controllers 126, 214 directly as would be the case in feed-forward. Feedback control and/or feed-forward control thus may not be provided and/or used between the valve drive assembly 124 and the controller 126 and/or between the controller 126 and the valve drive assembly 124.

Figure 4:
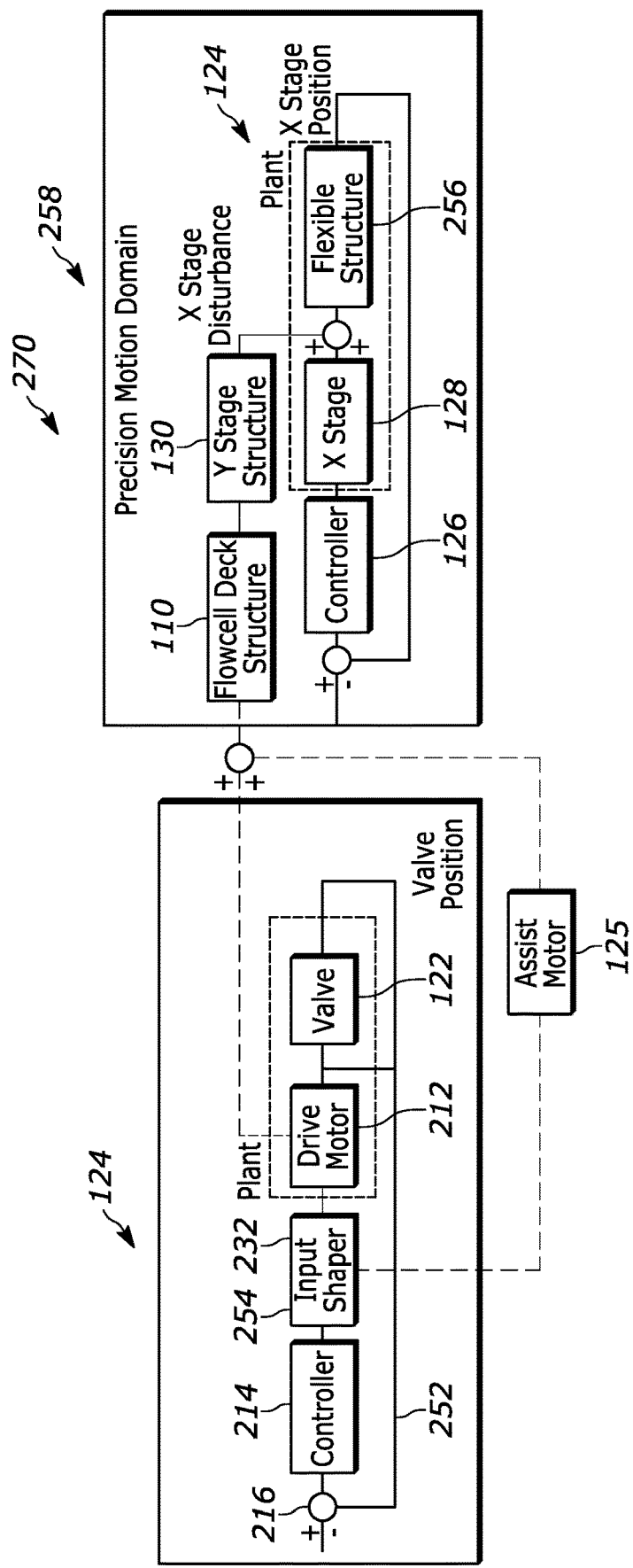
FIG. 4 is a schematic illustration of a portion of the system of FIG. 1 including the valve drive assembly of FIG. 2 and the motor of FIG. 1.

FIG. 4 is a schematic illustration of a portion 270 of the system 100 of FIG. 1 including the valve drive assembly 124 of FIG. 2 and the motor 125 of FIG. 1. The portion 270 is similar to the portion 250 of FIG. 3. The portion 270 of FIG. 4, however, includes the motor 125 that is coupled to the input shaper 254. The input shaper 254 is coupled to both the drive motor 212 and the motor 125. Using shaped input control and/or otherwise driving the motor 125 reduces and/or substantially cancels vibration caused by, for example, the drive motor 212 in the remote subsystem 258 of the system 100 including, for example, the x-drivetrain 128.

Figure 5:
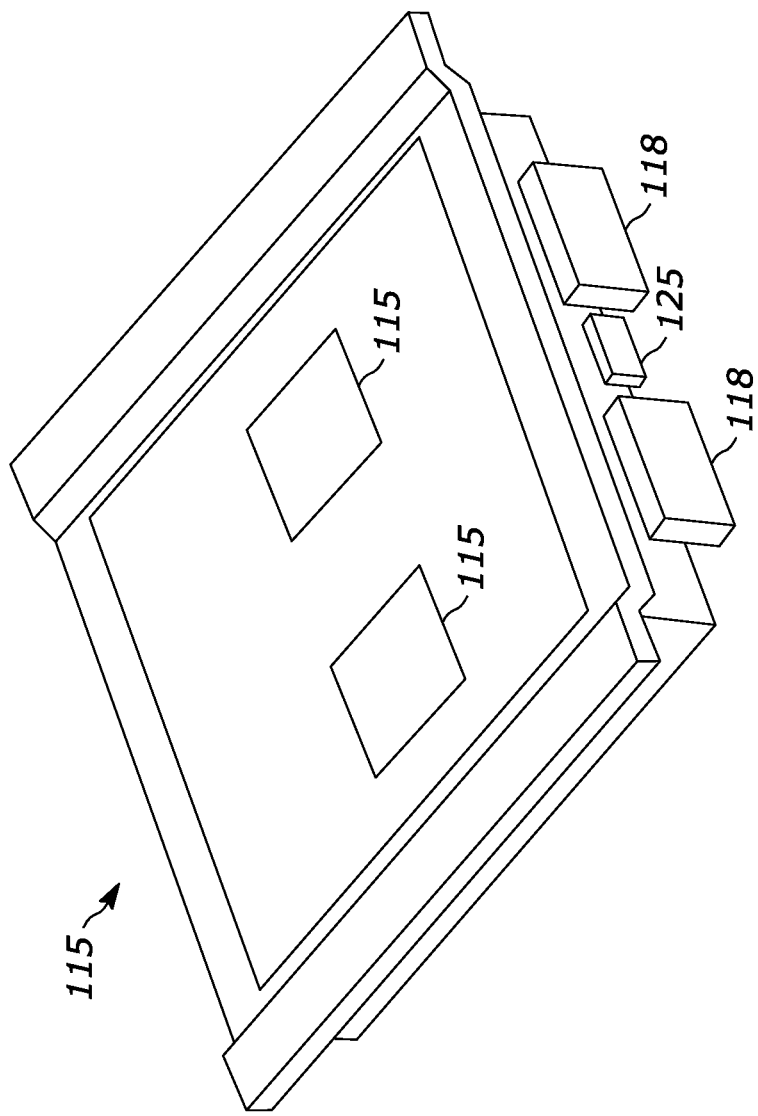
FIG. 5 is an isometric view of an example flow cell interface that can be used to implement the flow cell interface of FIG. 1.

FIG. 5 is an isometric view of an example flow cell interface 290 that can be used to implement the flow cell interface 110 of FIG. 1. The flow cell interface 290 includes the valve assemblies 118, 120, the flow cell chucks 115, and the motor 125 in the implementation shown. The motor 125 may alternatively be omitted.

Figure 6:
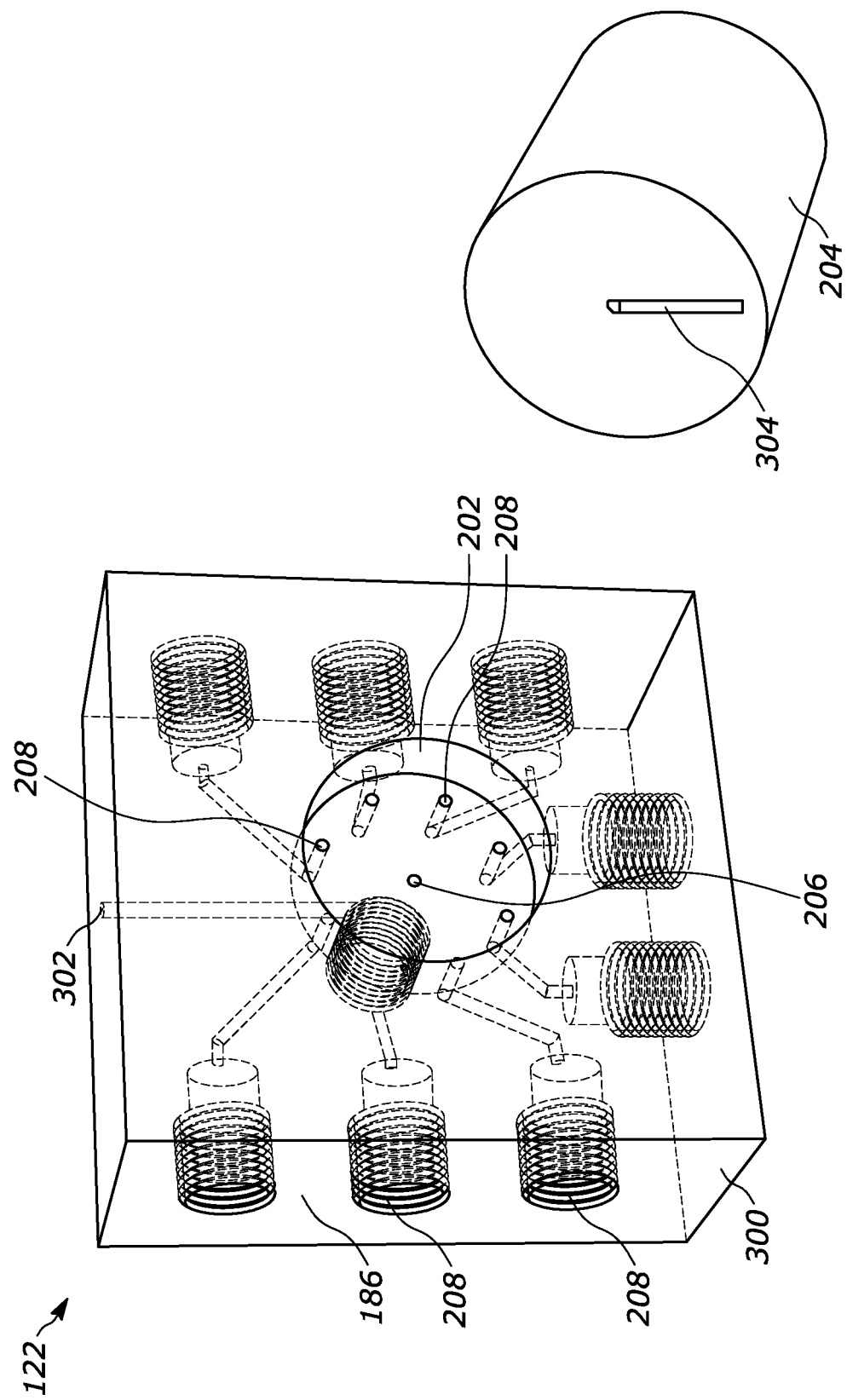
FIG. 6 is a schematic implementation of the reagent selector valve of FIGS. 1 and/or 2.

FIG. 6 is a schematic implementation of the valve 122 of FIGS. 1 and/or 2. The valve 122 includes the rotor 204 and a valve body 300 having the stator 202 in the implementation shown. The stator 202 and/or the rotor 204 may include ceramic and/or a polymer hybrid. Other materials for the valve 122 may prove suitable. The valve body 175 includes the common fluidic line 206, the reagent fluidic lines 208, and a flow cell fluidic line 302. The reagent fluidic lines 208 are to be fluidically coupled to the corresponding reagent reservoirs 182, the common fluidic line 206 is fluidically coupled to the reagent fluidic lines 208 and the flow cell fluidic line 302. The flow cell fluidic line 302 may be coupled to the flow cell 106 directly and/or indirectly through an intermediate component.

The rotor 204 interfaces with the stator 202 to fluidically couple the common fluidic line 206 and a corresponding reagent fluidic line 208. The rotor 204 includes a groove 304 that fluidically couples the common fluidic line 206 and the corresponding reagent fluidic line 208 in the implementation shown.

Figure 7:
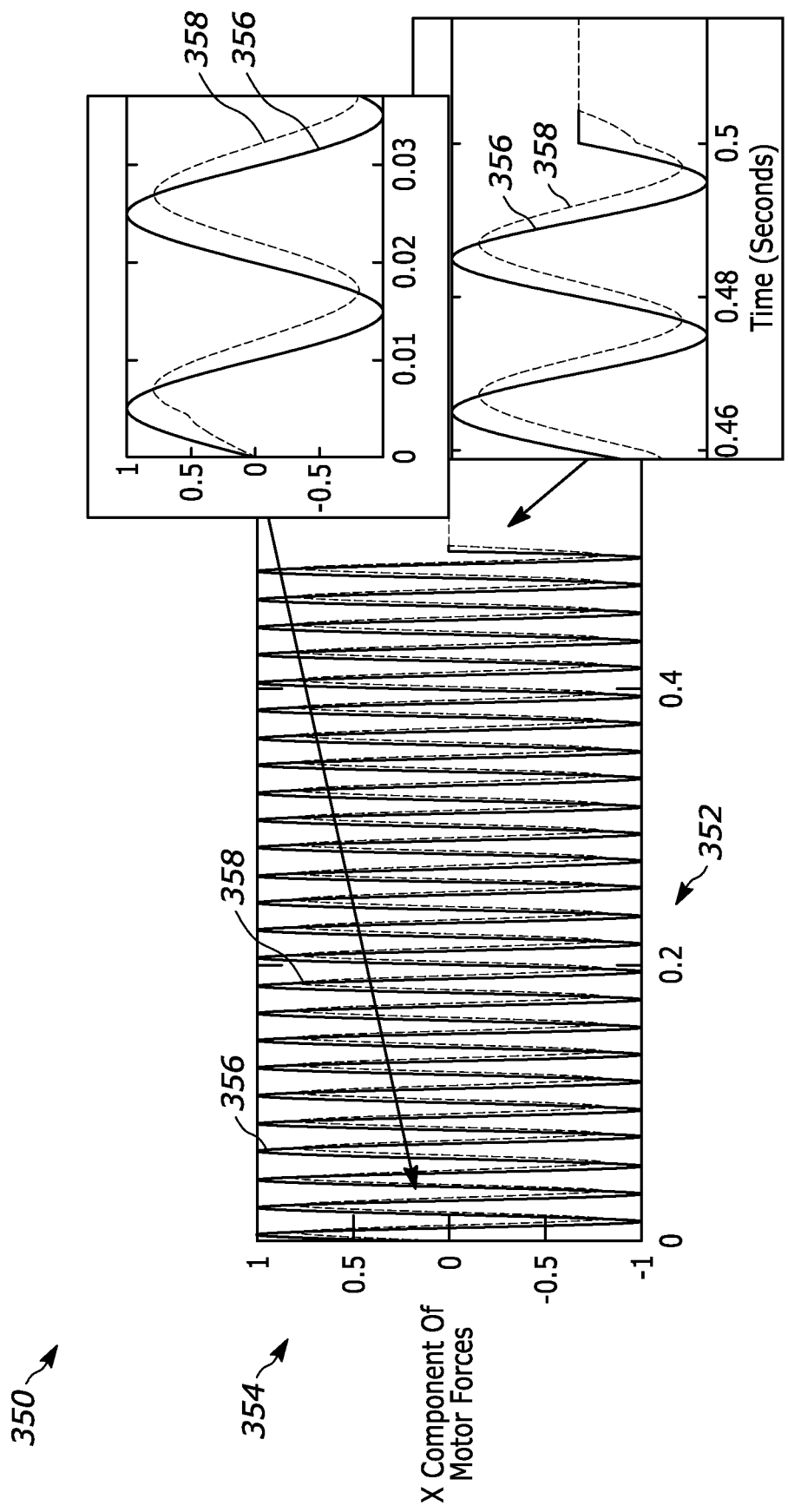
FIG. 7 shows a graph including an x-axis corresponding to time and a y-axis corresponding to the x-component of the motor forces.

FIG. 7 shows a graph 350 including an x-axis 352 corresponding to time and a y-axis 354 corresponding to the x-component of the motor forces. The motor forces may be related to the motor forces of the motor 212. The graph 350 includes a first line 356 representing an unshaped movement profile and a second line 358 representing a shaped movement profile.

Figure 8:
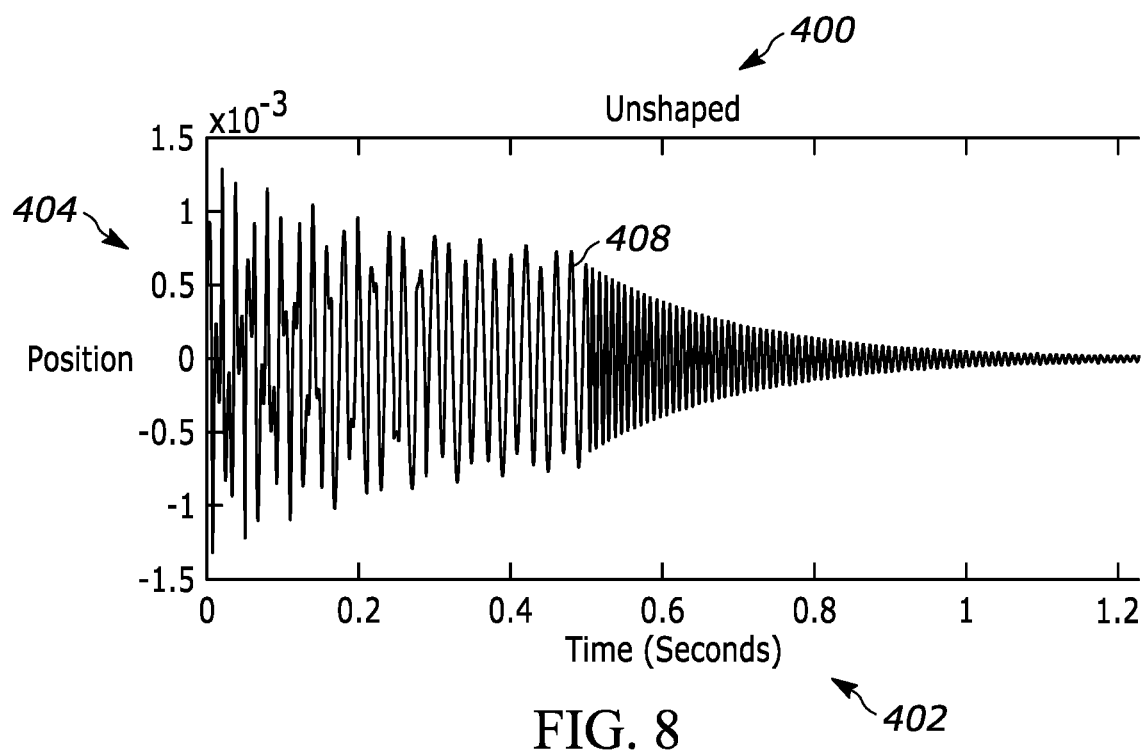
FIG. 8 shows a graph of simulation data including an x-axis corresponding to time, a y-axis corresponding to position, and a line representing the position of the x-stage assembly based on a rotational disturbance caused by the reagent selector valve assembly being controlled using unshaped input signals.

FIG. 8 shows a graph 400 of simulation data including an x-axis 402 corresponding to time, a y-axis 404 corresponding to position, and a line 408 representing the position of the x-motor, the y-stage, a flexible structure, and x-drivetrain 128 based on a rotational disturbance caused by the valve assembly 118 being controlled using unshaped input signals. The resonance caused in the x-drivetrain 128 may be about 118 hertz (Hz) and the motor 212 may be a 3000 rpm motor. The valve assembly 118 has stopped actuating at approximately 0.5 seconds as shown in the graph 400 but the vibration within the x-motor, the y-stage, the flexible structure, and the x-drivetrain 128 continues until about 1.2 seconds.

Figure 9:
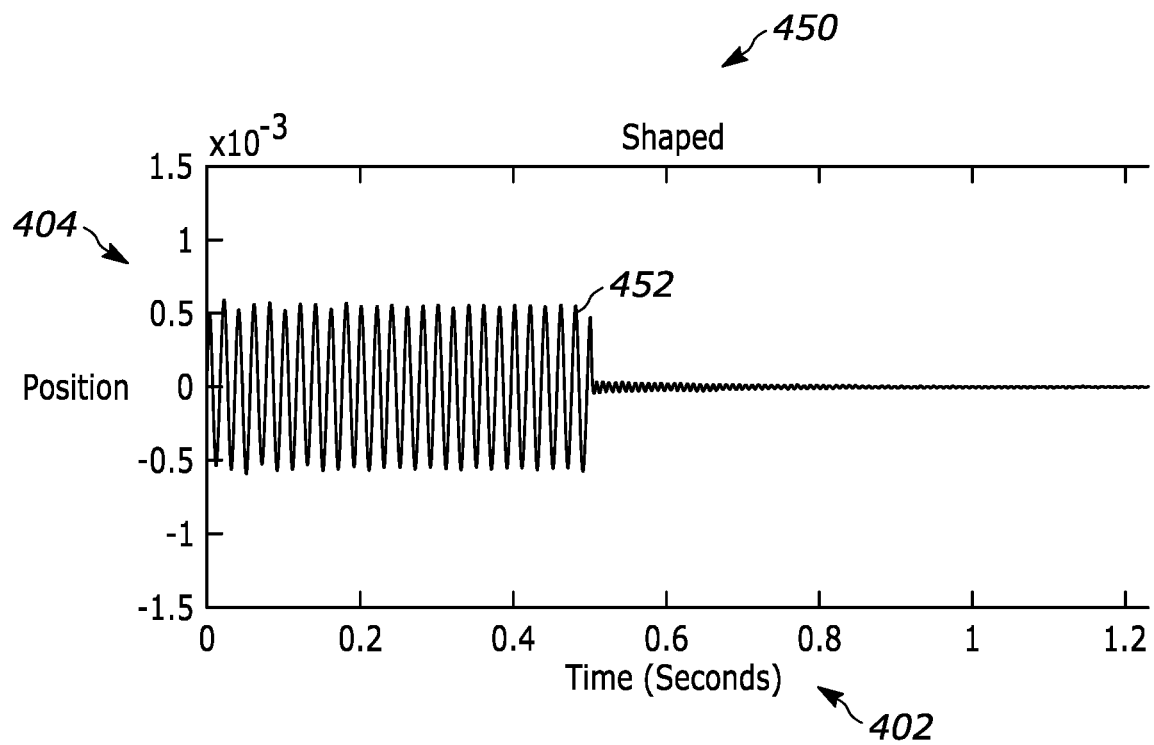
FIG. 9 shows another graph of simulation data including an x-axis corresponding to time, a y-axis corresponding to position, and a line representing the position of the x-stage assembly based on a rotational disturbance caused by the reagent selector valve assembly being controlled using shaped input signals.
Figure 10:
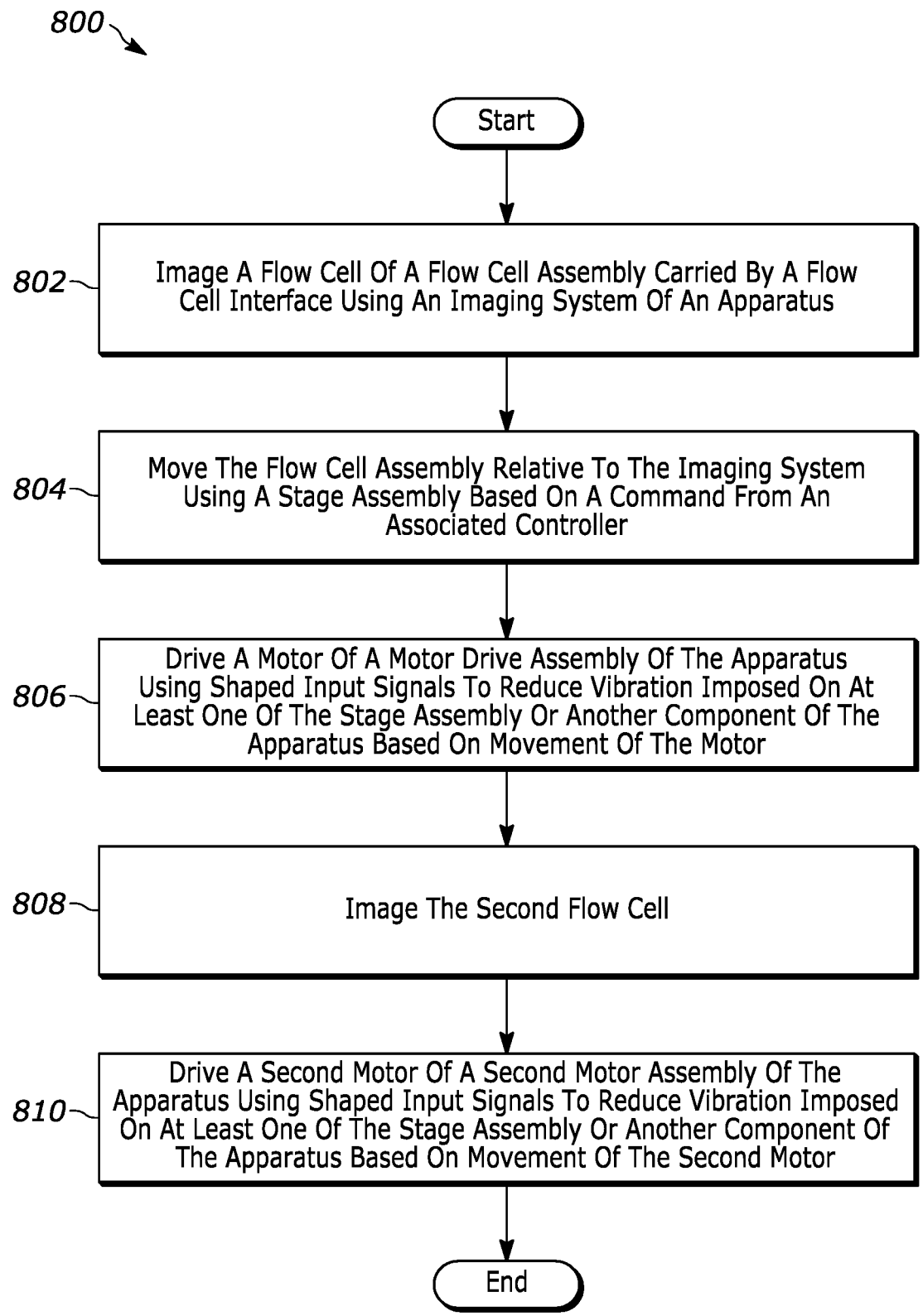
FIG. 10 illustrates a flowchart for a method of reducing vibration using the system of FIG. 1 or any of the disclosed implementations.
Figure 11:
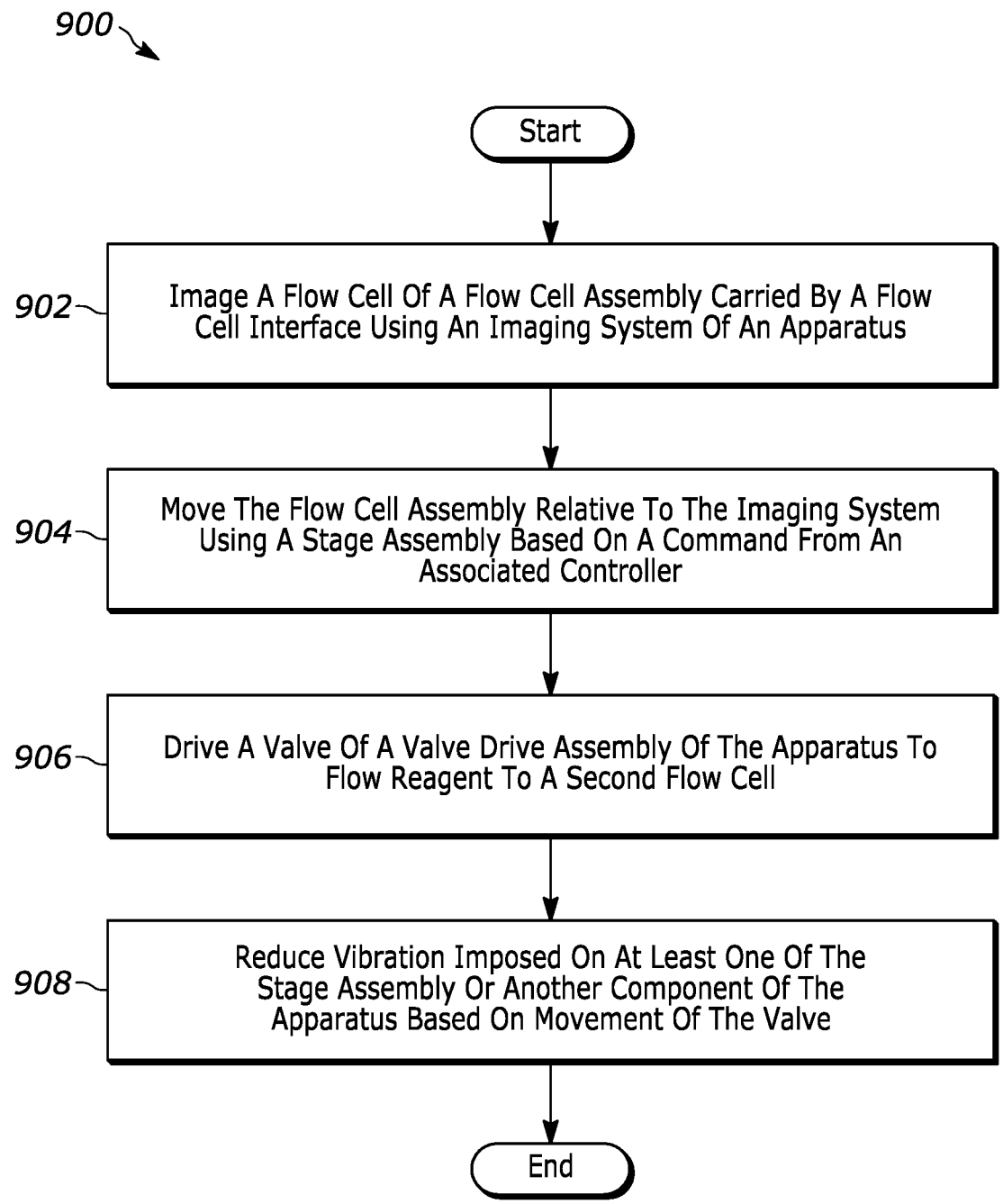
FIG. 11 illustrates another flowchart for a method of reducing vibration using the system of FIG. 1 or any of the disclosed implementations.

FIG. 9 shows another graph 450 of simulation data including an x-axis 402 corresponding to time, a y-axis 404 corresponding to position, and a line 452 representing the position of the x-motor, the y-stage, a flexible structure, and x-drivetrain 128 based on a rotational disturbance caused by the valve assembly 118 being controlled using shaped input signals. The valve assembly 118 has stopped actuating at approximately 0.5 seconds as shown and the vibration within the x-motor, the y-stage, the flexible structure, and x-drivetrain 128 almost immediately stops. FIG. 7 thus shows that using the disclosed examples a ring down phase or settling time of the vibration of the stage assembly 116 and/or of components of the system 100 may be reduced, enabling dual-flow cell, parallel architecture such as shown in the system 100 of FIG. 1.

FIGS. 8 and 9 illustrate flowcharts for a method of reducing vibration using the system 100 of FIG. 1 or any of the disclosed implementations. The order of execution of the blocks may be changed, and/or some of the blocks described may be changed, eliminated, combined, and/or subdivided into multiple blocks.

The process 800 of FIG. 8 begins with a flow cell 106 of a flow cell assembly 102 carried by a flow cell interface 100 being imaged using an imaging system 108 of an apparatus 100 (Block 802). The flow cell assembly 102 is moved relative to the imaging system 108 using a stage assembly 116 based on a command from an associated controller 126 (Block 804). Moving the flow cell assembly 102 relative to the imaging system 108 using the stage assembly 116 in some implementations includes moving the flow cell assembly 102 relative to the imaging system 108 using the stage assembly 116 in at least one of an x-direction or a y-direction.

A motor of the apparatus 100 is driven using shaped input signals to reduce vibration imposed on at least one of the stage assembly 116 or another component of the apparatus 100 based on movement of the motor (Block 806). The motor may be associated with the valve 122 and/or may be a rotary motor and/or a linear motor. Driving the motor using shaped input signals in some implementations includes driving the valve 122 using a valve drive assembly 124.

The apparatus 100 includes a second flow cell 106 of a second flow cell assembly 106 that is carried by the flow cell interface 110 and driving the motor includes flowing reagent to the second flow cell 106 in some implementations. The motor may be driven at the same time as the imaging of the flow cell 106 and/or the motor may be driven before the imaging of flow cell 106. The motor may be moved at any time, however, before, during, and/or after the flow cell 106 is imaged. Regardless of when the motor is driven, driving the motor using the shaped input signals reduces a ring down phase or settling time of the vibration of the stage assembly 116. When the vibration of the stage assembly 116 is at or below a threshold value, quality images of the flow cell 106 may be obtained by the imaging system 108.

The controller 126 associated with the stage assembly 116 does not receive motion or force information from the valve drive assembly 124 in some implementations and/or feedforward control is not provided between the valve drive assembly 124 and the controller 126 associated with the stage assembly 116. The motion or force information may include position information, velocity information, acceleration information, motor information, vibration force information, etc. The valve drive assembly 124 in some implementations does not receive motion or force information from the controller 126 associated with stage assembly 116 and/or feedback control is not provided between the controller 126 associated with the stage assembly 116 and the valve drive assembly 124.

The shaped input signals may include a convolved dual triangular profile; a convolved profile, at least two levels of acceleration, and/or at least two levels of deceleration. The shaped input signals in some implementations may include a first shaped input signal and a second shaped input signal that are separated by time to allow the second shaped input signal to substantially cancel the first shaped input signal and/or an S-curve profile.

The second flow cell 106 is imaged (Block 808) and a second motor 122 of the apparatus 100 is driven using shaped input signals to reduce vibration imposed on at least one of the stage assembly 116 or another component of the apparatus 100 based on movement of the second motor 122. The second motor may be associated with valve and/or a rotary motor and/or a linear motor. Driving the second motor 122 occurs in some implementations at the same time as the imaging of the second flow cell 106 and/or driving the second motor 122 occurs before the imaging of second flow cell 106. The motor may, however, be moved at any time before, during, and/or after the second flow cell 106 is imaged.

The process 900 of FIG. 9 begins with a flow cell 106 of a flow cell assembly 102 carried by a flow cell interface 100 being imaged using an imaging system 108 of an apparatus 100 (Block 902). The flow cell assembly 102 is moved relative to the imaging system 108 using a stage assembly 116 based on a command from an associated controller 126 (Block 904). Moving the flow cell assembly 102 relative to the imaging system 108 using the stage assembly 116 in some implementations includes moving the flow cell assembly 102 relative to the imaging system 108 using the stage assembly 116 in at least one of an x-direction or a y-direction.

A valve 122 of the apparatus 100 is driven to flow reagent to a second flow cell assembly 104 (Block 906) and vibration imposed on at least one of the stage assembly 116 or another component of the apparatus 100 is reduced (Block 908). Reducing vibration imposed on at least one of the stage assembly 116 or another component of the apparatus 100 based on movement of the valve 122 includes driving the motor 125 to reduce the vibration imposed on at least one of the stage assembly 116 or another component of the apparatus 100 and/or driving the valve 122 using shaped input signals to reduce vibration imposed on at least one of the stage assembly 116 or another component of the apparatus 100 based on movement of the valve 122.

In particular implementations, methods, and optical systems described herein may be used for sequencing nucleic acids. For example, sequencing-by-synthesis (SBS) protocols are particularly applicable. In SBS, a plurality of fluorescently labeled modified nucleotides are used to sequence dense clusters of amplified DNA (possibly millions of clusters) present on the surface of an optical substrate (e.g., a surface that at least partially defines a channel in a flow cell). The flow cells may contain nucleic acid samples for sequencing where the flow cells are placed within the appropriate flow cell holders. The samples for sequencing can take the form of single nucleic acid molecules that are separated from each other so as to be individually resolvable, amplified populations of nucleic acid molecules in the form of clusters or other features, or beads that are attached to one or more molecules of nucleic acid. The nucleic acids can be prepared such that they comprise an oligonucleotide primer adjacent to an unknown target sequence. To initiate the first SBS sequencing cycle, one or more differently labeled nucleotides, and DNA polymerase, etc., can be flowed into/through the flow cell by a fluid flow subsystem (not shown). Either a single type of nucleotide can be added at a time, or the nucleotides used in the sequencing procedure can be specially designed to possess a reversible termination property, thus allowing each cycle of the sequencing reaction to occur simultaneously in the presence of several types of labeled nucleotides (e.g. A, C, T, G). The nucleotides can include detectable label moieties such as fluorophores. Where the four nucleotides are mixed together, the polymerase is able to select the correct base to incorporate and each sequence is extended by a single base. Nonincorporated nucleotides can be washed away by flowing a wash solution through the flow cell. One or more lasers may excite the nucleic acids and induce fluorescence. The fluorescence emitted from the nucleic acids is based upon the fluorophores of the incorporated base, and different fluorophores may emit different wavelengths of emission light. A deblocking reagent can be added to the flow cell to remove reversible terminator groups from the DNA strands that were extended and detected. The deblocking reagent can then be washed away by flowing a wash solution through the flow cell. The flow cell is then ready for a further cycle of sequencing starting with introduction of a labeled nucleotide as set forth above. The fluidic and detection steps can be repeated several times to complete a sequencing run. Example sequencing methods are described, for example, in Bentley et al., Nature 456:53-59 (2008), WO 04/018497; U.S. Pat. No. 7,057,026; WO 91/06678; WO 07/123,744; U.S. Pat. Nos. 7,329,492; 7,211,414; 7,315,019; 7,405,281, and US 2008/0108082, each of which is incorporated herein by reference.

Optical systems described herein may also be used to scan samples that include microarrays. A microarray may include a population of different probe molecules that are attached to one or more substrates such that the different probe molecules can be differentiated from each other according to relative location. An array can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a BeadChip Array available from Illumina, Inc. (San Diego, Calif.) or others including beads in wells such as those described in U.S. Pat. Nos. 6,266,459, 6,355,431, 6,770,441, 6,859,570, and 7,622,294; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

An apparatus, comprising: a pair of flow cell assemblies including flow cells; and a system including: an imaging system; a flow cell interface having corresponding flow cell receptacles that support the corresponding flow cell assemblies; a stage assembly associated with a controller that causes the stage assembly to move the flow cell assemblies relative to the imaging system; and a pair of reagent selector valve assemblies, each reagent selector valve assembly corresponding to one of the flow cell assemblies and having a reagent selector valve and a valve drive assembly, wherein the valve drive assembly is to drive the corresponding reagent selector valve using shaped input signals to reduce vibration imposed on the stage assembly based on movement of the reagent selector valve.

The apparatus of any one or more of the preceding embodiments and/or any one or more of the embodiments disclosed below, wherein the controller associated with the stage assembly does not receive positional information from the valve drive assembly.

The apparatus of any one or more of the preceding embodiments and/or any one or more of the embodiments disclosed below, wherein feed-forward control is not provided between the valve drive assembly and the controller associated with the stage assembly.

The apparatus of any one or more of the preceding embodiments and/or any one or more of the embodiments disclosed below, wherein the valve drive assembly does not receive positional information from the controller associated with the stage assembly.

The apparatus of any one or more of the preceding embodiments and/or any one or more of the embodiments disclosed below, wherein feedback control is not provided between the controller associated with the stage assembly and the valve drive assembly.

The apparatus of any one or more of the preceding embodiments and/or any one or more of the embodiments disclosed below, wherein the shaped input signals comprise a convolved dual triangular profile.

The apparatus of any one or more of the preceding embodiments and/or any one or more of the embodiments disclosed below, wherein the shaped input signals comprise a convolved profile.

The apparatus of any one or more of the preceding embodiments and/or any one or more of the embodiments disclosed below, wherein the shaped input signals comprise at least two levels of acceleration.

The apparatus of any one or more of the preceding embodiments and/or any one or more of the embodiments disclosed below, wherein the shaped input signals comprise at least two levels of deceleration.

The apparatus of any one or more of the preceding embodiments and/or any one or more of the embodiments disclosed below, wherein the shaped input signals comprise a first shaped input signal and a second shaped input signal that are separated by time to allow the second shaped input signal to substantially cancel the first shaped input signal.

The apparatus of any one or more of the preceding embodiments and/or any one or more of the embodiments disclosed below, wherein the shaped input signals comprise an S-curve profile.

The apparatus of any one or more of the preceding embodiments and/or any one or more of the embodiments disclosed below, wherein the stage assembly is spaced from the reagent selector valve assemblies.

The apparatus of any one or more of the preceding embodiments and/or any one or more of the embodiments disclosed below, wherein the reagent selector valve assemblies are carried by the flow cell interface and wherein the stage assembly moves the flow cell interface in at least one of an x-direction or a y-direction relative to the imaging system.

The apparatus of any one or more of the preceding embodiments and/or any one or more of the embodiments disclosed below, wherein the stage assembly comprises a rotary stage.

The apparatus of any one or more of the preceding embodiments and/or any one or more of the embodiments disclosed below, further comprising a plurality of reagent reservoirs and wherein the system further comprises a reagent reservoir receptacle that receives the reagent reservoir, wherein the reagent selector valves are to be fluidically coupled to the reagent reservoirs and to selectively flow reagent from a corresponding reagent reservoir to the corresponding flow cells.

The apparatus of any one or more of the preceding embodiments and/or any one or more of the embodiments disclosed below, wherein the valve drive assembly comprises a motor.

The apparatus of any one or more of the preceding embodiments and/or any one or more of the embodiments disclosed below, wherein the valve drive assembly comprises a valve drive controller.

The apparatus of any one or more of the preceding embodiments and/or any one or more of the embodiments disclosed below, wherein the valve drive assembly comprises an encoder.

The apparatus of any one or more of the preceding embodiments and/or any one or more of the embodiments disclosed below, wherein each of the reagent selector valves comprises a rotor and a stator.

The apparatus of any one or more of the preceding embodiments and/or any one or more of the embodiments disclosed below, wherein the stator has a common fluidic line and a plurality of reagent fluidic lines, the common fluidic line couplable to the corresponding flow cell and wherein the rotor interfaces with the stator to fluidically couple the common fluidic line and one or more of the reagent fluidic lines.

The apparatus of any one or more of the preceding embodiments and/or any one or more of the embodiments disclosed below, wherein the rotor comprises a groove to fluidically couple the common fluidic line and the one or more of the reagent fluidic lines.

An apparatus, comprising: a system including: an imaging system; a flow cell interface having a corresponding flow cell receptacle; a stage assembly that moves the flow cell interface relative to the imaging system; a motor; and a drive assembly. The drive assembly is to drive the motor using shaped input signals to reduce vibration imposed on at least one of the stage assembly or another component of the apparatus based on movement of the motor.

The apparatus of any one or more of the preceding embodiments and/or any one or more of the embodiments disclosed below, wherein the motor comprises a rotary motor.

The apparatus of any one or more of the preceding embodiments and/or any one or more of the embodiments disclosed below, wherein the motor comprises a linear motor.

The apparatus of any one or more of the preceding embodiments and/or any one or more of the embodiments disclosed below, further comprising a valve assembly including a valve, the motor, and the drive assembly.

The apparatus of any one or more of the preceding embodiments and/or any one or more of the embodiments disclosed below, wherein the imaging system comprises a scanning electron microscope.

The apparatus of any one or more of the preceding embodiments and/or any one or more of the embodiments disclosed below, wherein the imaging system comprises a transmission electron microscope.

The apparatus of any one or more of the preceding embodiments and/or any one or more of the embodiments disclosed below, wherein the imaging system comprises an imaging flow cytometer.

The apparatus of any one or more of the preceding embodiments and/or any one or more of the embodiments disclosed below, wherein the imaging system is associated with high-resolution optical microscopy.

The apparatus of any one or more of the preceding embodiments and/or any one or more of the embodiments disclosed below, wherein the high-resolution optical microscope is associated with confocal microscopy.

The apparatus of any one or more of the preceding embodiments and/or any one or more of the embodiments disclosed below, wherein the high-resolution optical microscope is associated with epifluorescence microscopy.

The apparatus of any one or more of the preceding embodiments and/or any one or more of the embodiments disclosed below, wherein the high-resolution optical microscope is associated with two photon microscopy.

The apparatus of any one or more of the preceding embodiments and/or any one or more of the embodiments disclosed below, wherein the high-resolution optical microscope is associated with differential interference contrast microscopy.

The apparatus of any one or more of the preceding embodiments and/or any one or more of the embodiments disclosed below, wherein the other component of the apparatus comprises the imaging system.

An apparatus, comprising: an optical instrument; and a fluidics system comprising a valve assembly including a valve and a valve drive assembly, wherein the valve drive assembly is to drive the valve using shaped input signals to reduce vibration imposed on the optical instrument or associated with images obtained by the optical instrument based on movement of the valve.

The apparatus of any one or more of the preceding embodiments and/or any one or more of the embodiments disclosed below, wherein the optical instrument comprises an imaging system.

The apparatus of any one or more of the preceding embodiments and/or any one or more of the embodiments disclosed below, wherein the optical instrument comprises a telescope.

The apparatus of any one or more of the preceding embodiments and/or any one or more of the embodiments disclosed below, wherein the optical instrument comprises a microscope.

The apparatus of any one or more of the preceding embodiments and/or any one or more of the embodiments disclosed below, further comprising: a flow cell assembly including a flow cell; a flow cell interface having a corresponding flow cell receptacle that supports the flow cell assembly; and a stage assembly associated with a controller that causes the stage assembly to move the flow cell assembly relative to the optical instrument. The valve drive assembly is to drive the valve using shaped input signals to reduce vibration imposed on the stage assembly based on movement of the valve to reduce vibrations associated with images obtained by the optical instrument.

The apparatus of any one or more of the preceding embodiments and/or any one or more of the embodiments disclosed below, wherein the optical instrument comprises a scanning electron microscope.

The apparatus of any one or more of the preceding embodiments and/or any one or more of the embodiments disclosed below, wherein the optical instrument comprises a transmission electron microscope.

The apparatus of any one or more of the preceding embodiments and/or any one or more of the embodiments disclosed below, wherein the optical instrument comprises an imaging flow cytometer.

The apparatus of any one or more of the preceding embodiments and/or any one or more of the embodiments disclosed below, wherein the optical instrument is associated with high-resolution optical microscopy.

The apparatus of any one or more of the preceding embodiments and/or any one or more of the embodiments disclosed below, wherein the optical instrument is associated with confocal microscopy.

The apparatus of any one or more of the preceding embodiments and/or any one or more of the embodiments disclosed below, wherein the optical instrument is associated with epifluorescence microscopy.

The apparatus of any one or more of the preceding embodiments and/or any one or more of the embodiments disclosed below, wherein the optical instrument is associated with two photon microscopy.

The apparatus of any one or more of the preceding embodiments and/or any one or more of the embodiments disclosed below, wherein the optical instrument is associated with differential interference contrast microscopy.

A method, comprising: imaging a flow cell of a flow cell assembly carried by a flow cell interface using an imaging system of an apparatus; moving the flow cell assembly relative to the imaging system using a stage assembly based on a command from an associated controller; and driving a motor of the apparatus using shaped input signals to reduce vibration imposed on at least one of the stage assembly or another component of the apparatus based on movement of the motor.

The method of any one or more of the preceding embodiments and/or any one or more of the embodiments disclosed below, wherein driving the motor comprises driving a rotary motor.

The method of any one or more of the preceding embodiments and/or any one or more of the embodiments disclosed below, wherein driving the motor comprises driving a linear motor.

The method of any one or more of the preceding embodiments and/or any one or more of the embodiments disclosed below, further comprising a second flow cell of a second flow cell assembly carried by the flow cell interface, wherein driving the motor comprises flowing reagent to the second flow cell.

The method of any one or more of the preceding embodiments and/or any one or more of the embodiments disclosed below, wherein driving the motor occurs at the same time as the imaging of the flow cell.

The method of any one or more of the preceding embodiments and/or any one or more of the embodiments disclosed below, wherein driving the motor occurs before the imaging of the flow cell.

The method of any one or more of the preceding embodiments and/or any one or more of the embodiments disclosed below, wherein driving the motor using the shaped input signals reduces a ring down phase or settling time of the vibration of the stage assembly.

The method of any one or more of the preceding embodiments and/or any one or more of the embodiments disclosed below, further comprising imaging the second flow cell.

The method of any one or more of the preceding embodiments and/or any one or more of the embodiments disclosed below, further comprising driving a second motor of the apparatus using shaped input signals to reduce vibration imposed on at least one of the stage assembly or another component of the apparatus based on movement of the second motor.

The method of any one or more of the preceding embodiments and/or any one or more of the embodiments disclosed below, wherein driving the second motor occurs at the same time as the imaging of the second flow cell.

The method of any one or more of the preceding embodiments and/or any one or more of the embodiments disclosed below, wherein driving the second motor occurs before the imaging of the second flow cell.

The method of any one or more of the preceding embodiments and/or any one or more of the embodiments disclosed below, wherein driving the valve of the apparatus using shaped input signals comprises driving the valve using a valve drive assembly.

The method of any one or more of the preceding embodiments and/or any one or more of the embodiments disclosed below, wherein the controller associated with the stage assembly does not receive positional information from the valve drive assembly.

The method of any one or more of the preceding embodiments and/or any one or more of the embodiments disclosed below, wherein feed-forward control is not provided between the valve drive assembly and the controller associated with the stage assembly.

The method of any one or more of the preceding embodiments and/or any one or more of the embodiments disclosed below, wherein the valve drive assembly does not receive positional information from the controller associated with the stage assembly.

The method of any one or more of the preceding embodiments and/or any one or more of the embodiments disclosed below, wherein feedback control is not provided between the controller associated with the stage assembly and the valve drive assembly.

The method of any one or more of the preceding embodiments and/or any one or more of the embodiments disclosed below, wherein the shaped input signals comprise a convolved dual triangular profile.

The method of any one or more of the preceding embodiments and/or any one or more of the embodiments disclosed below, wherein the shaped input signals comprise a convolved profile.

The method of any one or more of the preceding embodiments and/or any one or more of the embodiments disclosed below, wherein the shaped input signals comprise at least two levels of acceleration.

The method of any one or more of the preceding embodiments and/or any one or more of the embodiments disclosed below, wherein the shaped input signals comprise at least two levels of deceleration.

The method of any one or more of the preceding embodiments and/or any one or more of the embodiments disclosed below, wherein the shaped input signals comprise a first shaped input signal and a second shaped input signal that are separated by time to allow the second shaped input signal to substantially cancel the first shaped input signal.

The method of any one or more of the preceding embodiments and/or any one or more of the embodiments disclosed below, wherein the shaped input signals comprise an S-curve profile.

The method of any one or more of the preceding embodiments and/or any one or more of the embodiments disclosed below, wherein moving the flow cell assembly relative to the imaging system using the stage assembly comprises moving the flow cell assembly relative to the imaging system using the stage assembly in at least one of an x-direction or a y-direction.

An apparatus, comprising: a system including: an imaging system; a flow cell interface having a pair of flow cell receptacles; a stage assembly associated with a controller that causes the stage assembly to move the flow cell interface relative to the imaging system; a pair or reagent selector valve assemblies each corresponding to one of the flow cell receptacles and having a reagent selector valve; and a motor. The system drives the motor to reduce vibration imposed on the stage assembly based on movement of the reagent selector valves.

The apparatus of any one or more of the preceding embodiments and/or any one or more of the embodiments disclosed below, further comprising an actuator comprising the motor.

The apparatus of any one or more of the preceding embodiments and/or any one or more of the embodiments disclosed below, wherein the reagent selector valve assemblies are carried by the flow cell interface and wherein the stage assembly moves the flow cell interface in at least one of an x-direction or a y-direction relative to the imaging system.

A method, comprising: imaging a flow cell of a flow cell assembly carried by a flow cell interface using an imaging system of an apparatus; moving the flow cell assembly relative to the imaging system using a stage assembly based on a command from an associated controller; driving a valve of the apparatus to flow reagent to a second flow cell; and reducing vibration imposed on at least one of the stage assembly or another component of the apparatus.

The method of any one or more of the preceding embodiments and/or any one or more of the embodiments disclosed below, wherein reducing vibration imposed on at least one of the stage assembly or another component of the apparatus based comprises driving a motor to reduce the vibration imposed on at least one of the stage assembly or another component of the apparatus.

The method of any one or more of the preceding embodiments and/or any one or more of the embodiments disclosed below, wherein reducing vibration imposed on at least one of the stage assembly or another component of the apparatus comprises driving the valve using shaped input signals to reduce vibration imposed on at least one of the stage assembly or another component of the apparatus.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," "including," "having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   a first flow cell assembly and a second flow cell assembly, each of the first and second flow cell assemblies including flow cells; and
   a system including:
      an imaging system;
      a flow cell interface having a first flow cell receptacle and a second flow cell receptacle that support the corresponding first and second flow cell assemblies;
      a stage assembly associated with a controller that causes the stage assembly to move the first and second flow cell assemblies relative to the imaging system; and
      a pair of reagent selector valve assemblies, each reagent selector valve assembly corresponding to one of the first and second flow cell assemblies and having a reagent selector valve and a valve drive assembly, wherein the valve drive assembly drives the corresponding reagent selector valve during operation using shaped input signals to reduce vibration imposed on the stage assembly based on movement of the reagent selector valve,
      wherein the reagent selector valve assemblies are carried by the stage assembly, and
      wherein the imaging system obtains image data associated with the first flow cell assembly while the reagent selector valve assembly is actuated to flow reagent into the second flow cell assembly without substantially imparting vibration into the system.

2. The apparatus of claim 1, wherein the controller associated with the stage assembly does not receive positional information from the valve drive assembly.

3. The apparatus of claim 1, wherein feed-forward control is not provided between the valve drive assembly and the controller associated with the stage assembly.

4. The apparatus of claim 1, wherein the valve drive assembly does not receive positional information from the controller associated with the stage assembly.

5. The apparatus of claim 1, wherein feedback control is not provided between the controller associated with the stage assembly and the valve drive assembly.

6. The apparatus of claim 1, wherein the shaped input signals comprise at least one of a convolved dual triangular profile, a convolved profile, at least two levels of acceleration, two levels of deceleration, or an S-curve profile.

7. The apparatus of claim 1, wherein the shaped input signals comprise a first shaped input signal and a second shaped input signal that are separated by time to allow the second shaped input signal to substantially cancel the first shaped input signal.

8. The apparatus of claim 1, wherein the reagent selector valve assemblies are carried by the flow cell interface and wherein the stage assembly moves the flow cell interface in at least one of an x-direction or a y-direction relative to the imaging system.

* * * * *